United States Patent
Kressmann et al.

(10) Patent No.: US 8,618,017 B2
(45) Date of Patent: Dec. 31, 2013

(54) IRREGULARLY SHAPED NON-SPHERICAL SUPPORTED CATALYST, AND A PROCESS FOR HYDROCONVERSION HEAVY OIL FRACTIONS

(75) Inventors: Stephane Kressmann, Serezin du Rhone (FR); Magalie Roy-Auberger, Nivolas-Vermelle (FR); Jean Luc Le Loarer, Salindres (FR); Denis Guillaume, Vienne (FR); Jean Francois Chapat, Saint-Cyr sur le Rhone (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 14 days.

(21) Appl. No.: 13/463,255

(22) Filed: May 3, 2012

(65) Prior Publication Data

US 2012/0245023 A1    Sep. 27, 2012

Related U.S. Application Data

(63) Continuation of application No. 12/158,594, filed as application No. PCT/FR2006/002765 on Dec. 14, 2006, now abandoned.

(30) Foreign Application Priority Data

Dec. 22, 2005 (FR) ...................... 05 13166

(51) Int. Cl.
*C10G 45/06* (2006.01)
(52) U.S. Cl.
USPC ............... 502/325; 502/8; 502/10; 502/27; 502/132; 502/439; 208/422; 208/423; 208/426
(58) Field of Classification Search
None
See application file for complete search history.

(56) References Cited

U.S. PATENT DOCUMENTS

| | | | | |
|---|---|---|---|---|
| 3,411,878 A | * | 11/1968 | Michel et al. | ........... 423/626 |
| 4,498,972 A | | 2/1985 | Toulhoat et al. | |
| 4,510,042 A | | 4/1985 | Billon et al. | |
| 4,552,650 A | * | 11/1985 | Toulhoat et al. | ....... 208/216 PP |
| 4,584,093 A | * | 4/1986 | Toulhoat et al. | ......... 208/216 R |
| 6,006,308 A | | 12/1999 | Matsunami et al. | |
| 6,043,187 A | | 3/2000 | Harle et al. | |
| 6,132,597 A | * | 10/2000 | Harle et al. | ........... 208/213 |
| 6,309,537 B1 | | 10/2001 | Harle et al. | |
| 2005/0211603 A1 | | 9/2005 | Guillaume et al. | |

FOREIGN PATENT DOCUMENTS

| | | |
|---|---|---|
| FR | 2528721 A1 | 12/1983 |
| FR | 2534828 A1 | 4/1984 |
| FR | 2538813 A1 | 7/1984 |
| FR | 2538814 A1 | 7/1984 |
| FR | 2867988 A1 | 9/2005 |

OTHER PUBLICATIONS

International Search Report for PCT/FR2006/002765 dated Jun. 12, 2007.

* cited by examiner

*Primary Examiner* — Melvin C Mayes
*Assistant Examiner* — Colette Nguyen
(74) *Attorney, Agent, or Firm* — Millen, White, Zelano & Branigan, P.C.

(57) ABSTRACT

A catalyst for hydrotreating and/or hydroconverting heavy metal-containing hydrocarbon feeds, comprises a support in the form of mainly irregular and non-spherical alumina-based agglomerates the specific shape. The catalyst is prepared by a specific order of steps: crushing, calcining, acidic autoclaving, drying, further calcining and impregnation with catalytic metals.

6 Claims, No Drawings

IRREGULARLY SHAPED NON-SPHERICAL SUPPORTED CATALYST, AND A PROCESS FOR HYDROCONVERSION HEAVY OIL FRACTIONS

This application is a continuation of U.S. patent application Ser. No. 12/158,594, filed on Jun. 20, 2008, now abandoned.

FIELD OF THE INVENTION

The present invention concerns a catalyst for hydrotreating and/or hydroconverting heavy metal-containing hydrocarbon feeds, said catalyst comprising a support in the form of mainly irregular and non-spherical alumina-based agglomerates the specific shape of which results from a crushing step, and comprising at least one catalytic metal or a compound of a catalytic metal from group VIB (group 6 in the new periodic table notation) and/or group VIII (groups 8, 9 and 10 of the new periodic table notation), optionally at least one doping element selected from the group constituted by phosphorus, boron and silicon (or silica which does not form part of that which may be contained in the selected support) and halogens, said catalyst essentially being constituted by a plurality of juxtaposed agglomerates each formed by a plurality of acicular platelets, the platelets of each agglomerate generally being oriented radially with respect to each other and with respect to the centre of the agglomerate. The specific shape of the catalyst improves its performance when using it for hydroconverting/hydrotreating heavy metal-containing hydrocarbon feeds.

PRIOR ART

The skilled person will be aware that during hydrorefining and/or hydroconverting oil fractions containing organometallic complexes, the majority of those complexes are destroyed in the presence of hydrogen, hydrogen sulphide and a hydrotreatment catalyst. The constituent metal of those complexes then precipitates in the form of a solid sulphide which will become bound to the inner surface of the pores. This is particularly the case with complexes of vanadium, nickel, iron, sodium, titanium, silicon and copper which are naturally present in crude oils to a greater or lesser extend depending on the origin of the oil and which, during distillation operations, tend to become concentrated in the high boiling point fractions and in particular in residues. This is also the case with coal liquids which comprises metals, in particular iron and titanium. The general term "hydrodemetallization" is used to denote destruction or deaggregation of organometallic complexes in hydrocarbons.

The accumulation of solid deposits in the pores of a catalyst may continue until some of the pores controlling access of reagents to a fraction of the interconnected pore network is plugged so that that fraction becomes inactive even though the pores of that fraction are only slightly obscured or even intact. That phenomenon may thus cause premature and major deactivation of the catalyst. This is particularly the case with hydrodemetallization reactions carried out in the presence of a supported heterogeneous catalyst. The term "heterogeneous" means not soluble in the hydrocarbon feed. In this case, it can be shown that the pores of the periphery become blocked more quickly that the central pores. Similarly, the pore mouths become blocked more quickly than their other parts. Pore obstruction goes hand in hand with a gradual reduction in their diameter, which increasingly limits diffusion of molecules and accentuates the concentration gradient and thus the heterogeneity of the deposit from the periphery to the interior of the porous particles, to the point that total obstruction of the pores mouth to the exterior occurs very rapidly: access to the almost intact internal porosity of the particles is thus impossible for the reagents and the catalyst is prematurely deactivated.

The phenomenon which has just been described is well known as pore mouth plugging. Proof of its existence and an analysis of its causes have been widely published in the international scientific literature.

A catalyst for hydrotreating heavy metal-containing hydrocarbon cuts must thus be composed of a support having a pore profile, a pore structure and a shape (geometry) which is particularly suited to the intragranular diffusional constraints specific to hydrotreatments to avoid problems with plugging mentioned above.

Usually, the catalysts are in the form of beads or extrudates and are composed of an alumina-based support having a particular porosity and an active phase based on mixed sulphides constituted both by a sulphide of a group VIB metal (preferably molybdenum) and a sulphide of a group VIII metal (preferably Ni or Co). The metals are deposited in the oxide state and are sulphided to be active for hydrotreatment. The atomic ratio between the group VIII element and the group VIB element which is usually considered to be optimal, group VIII atom/group VIB atom, is in the range 0.4 to 0.6. Recently, it has been shown in European document EP-A1-1 364 707 (FR-A-2 839 902) that independently of the pore texture, a ratio of less than 0.4 can limit catalyst deactivation and thus prolong the service life of the catalysts.

The skilled person will be aware that two types of alumina-based support for catalysts for hydrorefining and/or hydroconverting heavy metal-containing hydrocarbon feeds. These supports are broadly distinguished by their pore distribution profiles.

Catalysts with a bimodal porosity profile are highly active, but have a poorer retention capacity than catalysts with a polymodal porosity profile.

The polymodal porosity profile corresponds to a graph of the cumulative distribution of the pore volume as a function of the pore diameter obtained by the mercury intrusion method which is neither monomodal nor bimodal, in the sense that distinct categories of pores appear with pore diameters which are centred on well defined mean values do not appear, but a relatively continuous pore distribution is seen between two extreme diameter values. Between those extreme values, there is no horizontal stage in the pore distribution curve. Said polymodal distribution is linked to a "thorny chestnut husk" or "sea-urchins" pore structure obtained with alumina agglomerates prepared by the rapid dehydration of hydrargillite then agglomerating the flash alumina powder obtained in accordance with one of the Applicant's patents (U.S. Pat. No. 4,552,650—IFP). The prepared alumina agglomerates may be in the form of beads or in the form of extrudates, as shown in FR-A-2 764 213 and U.S. Pat. No. 6,043,187.

The thorny chestnut husk or sea-urchins structure is constituted by a plurality of juxtaposed agglomerates each formed by a plurality of acicular platelets, the platelets of each agglomerate generally being radially orientated with respect to each other and with respect to the centre of the agglomerate. At least 50% of the acicular platelets have a dimension along their longer axis of between 0.05 and 5 micrometers and preferably between 0.1 and 2 micrometers, a ratio of this dimension to their average width of between 2 and 20, preferably between 5 and 15, and a ratio of this dimension to their average thickness of between 1 and 5000, preferably between 10 and 200. At least 50% of the agglomerates of acicular platelets constitutes a collection of pseudo-spherical particles with a mean size of between 1 and 20 micrometers, preferably between 2 and 10 micrometers. A highly suitable image which can be used to help to represent such a structure is a pile of thorny chestnut-husks or of a pile of sea-urchins, hence the pore structure denominations "thorny chestnut husk" or "sea-urchins" which is used by the skilled person.

The majority of the pores is constituted by the free spaces located between the radiating acicular platelets. These pores, which are by nature "wedge-shaped", have a continuously variable diameter of between 100 and 1000 Å. The network of interconnected macropores results from the space which is left free between the juxtaposed agglomerates.

These catalysts with a polymodal pore profile have a pore distribution (determined by mercury porosimetry) which is preferably characterized as follows:
    total pore volume: 0.7 to 2.0 cm$^3$/g;
    % of total pore volume as pores with a mean diameter of less than 100 Å: between 0 and 10
    % of total pore volume as pores with a mean diameter between 100 and 1000 Å: between 40 and 90
    % of total pore volume as pores with a mean diameter between 1000 and 5000 Å: between 5 and 60
    % of total pore volume as pores with a mean diameter between 5000 and 10000 Å: between 5 and 50
    % of total pore volume as pores with a mean diameter of more than 10000 Å: between 5 and 20.

The specific surface area of these catalysts, measured using the BET method, is in the range 50 to 250 m$^2$/g.

The "thorny chestnut husk" or "sea-urchins" pore structure associated with the pore distribution characteristics described above can produce hydrorefining and/or hydroconversion catalysts with very high retention powers while keeping the hydrodemetallization activity high, which performances cannot be achieved with bimodal catalysts. The reasons are that the "wedge-shaped" shape of the mesopores in the thorny chestnut husk or sea-urchins structure compensate for or cut out the concentration gradients of the reagents which would normally be established in a cylindrical pore, which phenomenon forms a highly favorable geometry which can counter pore mouth plugging. Further, each mesopore or practically each pore has access independently of others to the interstitial macroporosity favoring homogeneous accumulation of deposits without premature deactivating plugging.

These catalysts, however, suffer from the disadvantage of being less active as regards initial activity than bimodal catalysts for HDM (hydrodemetallization), HDAC7 (hydroconverting asphaltenes which are insoluble in n-heptane), HDCCR (hydroconverting carbonaceous residues quantified by Conradson carbon analysis).

In processes for ebullated bed hydroconversion processing hydrocarbon feeds with high metal contents (Ni+V of more than 250 ppm, for example), the poorer initial performances of that catalyst with a thorny chestnut husk pore structure or sea-urchins pore structure requires a daily fairly large quantity of fresh makeup catalyst.

For ebullated bed hydroconversion, the catalyst is used in the form of beads or extrudates. The "bead" form means that bed fluidization is more homogeneous and its abrasion resistance properties are improved over the "extrudate" form. The beads move more homogeneously and the homogeneity of the solids in the bed means that a good metal retention level is achieved while avoiding the phenomena of segregation due to gravity. The bead size is also adjustable as a function of the desired chemical activity to minimize problems linked to diffusion of molecules into the pores of the catalyst. Metal capture is considerably enhanced in an ebullated bed compared with a fixed bed.

Similarly, in fixed bed processes for hydrorefining residues, the catalyst with a thorny chestnut husk or sea-urchins pore structure has a poorer performance (compared with bimodal catalysts) as regards the initial performance in the HDAC7, HDM, HDCCR functions, although they have a high retaining power which is necessary to process hydrocarbon feeds with a high metals content (Ni+V of more than 40 ppm, for example). Thus, using that type of catalyst penalizes the performance of downstream HDS catalysts, which are thus poorly protected from asphaltenes, from Ni+V deposition and from coke deposition.

FR-A-2 534 828 describes the preparation of catalysts containing one or more metals from groups V, VI and/or VIII and an alumina, silica or silica-alumina type support, said support being crushed but when an autoclaving step is carried out in the process, the crushing operation is systematically carried out after that autoclaving step.

Surprisingly, the Applicant has discovered that polymodal catalysts with a thorny chestnut husk structure in the form of alumina-based agglomerates, which are mainly irregular and non-spherical, may be obtained with an improved strength compared with those obtained by the process of FR-A-2 534 828 by modifying the position of the crushing step in the steps of the preparation process. This important advantage allows the catalyst to be used in an ebullated bed reactor, whereas this would have been impossible with the catalyst obtained by the process of FR-A-2 534 828.

Along with the increased strength, the catalysts obtained in accordance with the invention can produce optimum performances as regards HDAC7, HDM activity, stability and retention capacity for hydroconverting heavy metal-containing hydrocarbon feeds.

DESCRIPTION OF THE INVENTION

The invention concerns a catalyst which can be used in fixed or ebullated bed hydrorefining (hydrotreatment) and/or hydroconversion of heavy metal-containing hydrocarbon feeds having both an improved activity, a high retention power, a high stability of performance and a high strength.

Said catalyst comprises a porous alumina-based support having a thorny chestnut husk or sea-urchins pore structure and is characterized by the irregular and non-spherical shape of said support. This is mainly in the form of fragments obtained by crushing alumina beads using a process as defined below.

More precisely, the invention concerns a catalyst comprising an alumina-based support, at least one catalytic metal or compound of a catalytic metal from group VIB and/or VIII, the pore structure of which is composed of a plurality of juxtaposed agglomerates each formed by a plurality of acicular platelets, the platelets of each agglomerate being generally oriented radially with respect to the others and with respect to the centre of the agglomerate, said support having an irregular and non-spherical shape and being mainly in the form of fragments obtained by crushing alumina beads, and prepared using a process including the following steps:
    a) granulation starting from an active alumina powder having a low crystallinity and/or amorphous structure, to obtain agglomerates in the form of beads;
    b) maturing in a moist atmosphere between 60° C. and 100° C. then drying said beads;
    c) sieving to recover a fraction of said beads;
    d) crushing said fraction;

e) calcining at least a portion of said crushed fraction at a temperature in the range 250° C. to 900° C.;
f) impregnating with acid and hydrothermal treatment at a temperature in the range 80° C. to 250° C.;
g) drying then calcining at a temperature in the range 500° C. to 1100° C.

The granulometry of the support obtained at the end of the process is such that the diameter of the sphere which circumscribes at least 80% by weight of said fragments after crushing is in the range 0.05 to 3 mm In the case in which the catalyst is used in an ebullated bed, said diameter is preferably between 0.1 and 2 mm and, highly preferably, between 0.3 and 1.5 mm In the case in which a fixed bed catalyst is used, said diameter is preferably between 1.0 and 2.0 mm.

The active phase of said catalyst contains at least one catalytic metal or a compound of a catalytic metal from group VIB (group 6 in the new periodic table notation), preferably molybdenum or tungsten, and/or optionally at least one catalytic metal or a compound of a catalytic metal from group VIII (groups 8, 9 and 10 in the new periodic table notation), preferably nickel or cobalt. The catalyst may further comprise at least one doping element selected from phosphorus, boron, silicon and halogens (group VIIA or group 17 of the new periodic table notation), preferably phosphorus. The silicon deposited on the catalyst and considered henceforth to be a doping element, is distinguished from the silicon which may be present in an endogenous manner in the initial support. The deposited silicon can be quantified using a Castaing microprobe.

Preferably, the catalyst contains at least one group VIB metal (preferably molybdenum) and optionally at least one non noble group VIII metal, preferably nickel. A preferred catalyst of this type is Ni Mo P.

Without wishing to be bound by any particular theory, it appears that the improved properties of the catalyst of the present invention are due to improved diffusion of species into the interior of the catalyst grain and by association, the small size of the grains or fragments, their specific form resulting in a higher external surface area/grain volume ratio and to a thorny chestnut husk or sea-urchins porosity.

The "wedge-shaped" shape of mesopores of the thorny chestnut husk or sea-urchins structure compensates or cuts out the reagent concentration gradients which would normally occur in a cylindrical pore. The small grain size of the support and their specific irregular non-spherical shape encourages homogeneous ingress of reagents into the macroporosity and at each facet, without plugging the pore mouths. Finally, the mean free path or effective diameter inside a grain or fragment is always less than the diameter of the sphere circumscribing said fragment, while it is strictly identical to the diameter in the case of beads. Despite the very irregular shape of the grains or fragments, it is possible, however, to circumscribe a sphere in each of them and the fragment size is defined by the diameter of the sphere circumscribing said fragment.

For an equal size, the specific shape of the grains or fragments, irregular and non-spherical, thus encourages intragranular diffusion phenomena. The hydrodemetallization (HDM) and hydroconversion functions of asphaltenes which are insoluble in n-heptane (HDAC7) are increased.

The quantity of group VIB metal, expressed as a % by weight of oxide with respect to the weight of the final catalyst, is in the range 1% to 20%, preferably in the range 5% to 15%.

The quantity of non-noble group VIII metal, expressed as a % by weight of oxide with respect to the final catalyst weight, may be in the range 0 to 10%, preferably in the range 1% to 4%.

The quantity of phosphorus, expressed as a % by weight of oxide with respect to the final catalyst weight, may be in the range 0.3% to 10%, preferably in the range 1% to 5%, and more preferably in the range 1.2% to 4%.

The quantity of boron, expressed as a % by weight of oxide with respect to the weight of the final catalyst, is less than 6%, preferably less than 2%.

The atomic ratio between the elemental phosphorus and the group VIB element is advantageously in the range 0.3 to 0.75.

When at least one doping element is silicon, the silicon content is in the range 0.1% to 10% by weight of oxide with respect to the final catalyst weight.

When at least one doping element is a halogen (group VIIA), the halogen content is less than 5% by weight with respect to the final catalyst weight.

Preparation of Support

The alumina-based support has a pore structure which is composed of a plurality of juxtaposed agglomerates each formed by a plurality of acicular platelets, the platelets of each agglomerate generally being oriented radially with respect to the others and with respect to the centre of the agglomerate, said support having an irregular and non-spherical shape and being mainly in the form of fragments obtained by crushing alumina beads, and prepared using a process including the following steps:

a) granulation starting from an active alumina powder having a low crystallinity and/or amorphous structure, to obtain agglomerates in the form of beads;
b) maturing in a moist atmosphere between 60° C. and 100° C. then drying said beads;
c) sieving to recover a fraction of said beads;
d) crushing said fraction;
e) calcining at least a portion of said crushed fraction at a temperature in the range 250° C. to 900° C.;
f) impregnating with acid and hydrothermal treatment at a temperature in the range 80° C. to 250° C.;
g) drying then calcining at a temperature in the range 500° C. to 1100° C.

The granulometry of the support obtained at the end of the process is such that the diameter of the sphere circumscribing at least 80% by weight of said fragments after crushing is in the range 0.05 to 3 mm In the case in which the catalyst is used in an ebullated bed, said diameter is preferably between 0.1 and 2 mm and, highly preferably, between 0.3 and 1.5 mm. In the case in which a fixed bed catalyst is used, said diameter is preferably between 1.0 and 2.0 mm.

a) The first step, termed granulation, aims to form substantially spherical agglomerates from an active alumina powder having a low crystallinity and/or amorphous structure produced using the process described in FR-A-1 438 497. That process consists of moistening, using an aqueous solution, the active alumina having a low crystallinity and/or amorphous structure, then agglomerating it in a granulator or pelletizer. Preferably, one or more pore-forming agents are added during granulation. Particular pore-forming agents which may be used are wood flour, wood charcoal, cellulose, starches, naphthalene and, generally, any organic compound which may be eliminated by calcining.

The term "low crystallinity alumina structure" means an alumina wherein X ray analysis produces a diagram having no or only a few diffuse lines corresponding to crystalline phases of the low temperature transition aluminas and essentially comprising khi, rho, eta, gamma, pseudo-gamma phases and mixtures thereof. The active alumina employed is generally obtained by rapid dehydration of aluminium hydroxides such as bayerite, hydrargillite or gibbsite, nordstrandite or aluminium oxyhydroxides such as boehmite or diaspore. Said dehydration may be carried out in any suitable apparatus using a stream of hot gas. The inlet temperature for the gas into the apparatus generally varies from about 400° C. to 1200° C. and the contact time for the hydroxide or oxyhydroxide with the hot gases is generally in the range between a fraction of a second and 4 to 5 seconds.

The specific surface area, measured by the BET method, of the active alumina obtained by rapid dehydration of hydroxides or oxyhydroxides is generally between about 50 and 400 m²/g, the particle diameter is generally in the range 0.1 to 300 micrometers and is preferably in the range 1 to 120 micrometers. The loss on ignition, measured by calcining at 1000° C., is generally in the range 3% to 15%, corresponding to a $H_2O/Al_2O_3$ mole ratio in the range from about 0.17 to 0.85.

In a particular implementation, an active alumina is used which derives from the rapid dehydration of Bayer hydrate (hydrargillate) which is a readily commercially available, cheap aluminium hydroxide; such an active alumina is well known in the art; a process for its preparation has been described in FR-A-1 108 011.

The active alumina employed may be used as is or after treatment so that its sodium content, expressed as $Na_2O$, is less than 1000 ppm by weight. Further, it generally contains between 100 and 1000 ppm by weight of endogenous silica. The active alumina employed may or may not have been milled b) The spherical agglomerates obtained are then matured in a moist atmosphere at low temperature, preferably in the range from 60° C. to about 100° C., then dried at a temperature which is generally 100° C. to 120° C.

c) At this stage, the agglomerates, substantially in the form of beads, have sufficient mechanical strength to be sieved to select the granulometric range which is suitable for the desired final granulometry. Thus, for example, to obtain a final support with a size range of 0.7-1.4 mm, a bead fraction in the range 1.4-2.8 mm is sieved and selected; to obtain a final support in the 1-2 mm range size, a bead fraction with a size range of 2-4 mm is selected; finally, to obtain a final support in the size range 2-3 mm, a bead fraction with a size range of 4-6 mm is sieved and selected.

d) Next, the bead fraction with the selected size range is crushed. This operation is carried out in any known crusher known to the skilled person and preferably in a ball mill. It lasts from 5 to 60 minutes, preferably 10 to 30 minutes.

At the end of the crushing step, the alumina support is mainly in the form of fragments with a highly irregular and non-spherical shape. To better define the shape obtained, the fragments may be said to be in the form of broken beads without having very clean break surfaces, or in the form of solids the closest geometrical shape of which is an irregular polyhedron not necessarily having planar faces. The term "mainly" means that at least 50% by weight, preferably at least 60% by weight of the spherical agglomerates have effectively undergone a modification to their shape during crushing, the complementary portion representing the spherical agglomerates remaining intact. It is well known that crushing is a low efficiency, crude operation and routinely, a non negligible portion of the grains is not crushed.

To obtain a final catalyst with sufficient mechanical strength, the crushing step must be carried out prior to calcining and hydrothermal treatment (steps e) and f) respectively).

e) After the crushing step, at least a portion of the fragments is calcined at a temperature in the range from about 250° C. to about 900° C., preferably 500° C. to 850° C. The portion which is not calcined generally corresponds to fines which do not fall within the required dimensional range. Preferably, all of the crushed fraction is calcined.

f) Acid impregnation of the support is then carried out, followed by hydrothermal treatment using the method described in U.S. Pat. No. 4,552,650 which may be applied in its entirety to the present process:

the crushed agglomerates are treated in an aqueous medium comprising—and preferably constituted by—a mixture of at least one acid to dissolve at least a portion of the support alumina, and at least one compound supplying an anion which is capable of combining with the aluminium ions in solution, the compound being chemically distinct from said acid;

simultaneously or successively treating the treated crushed agglomerates hydrothermally (or in an autoclave). The term "acid to dissolve at least a portion of the support alumina" means any acid which, brought into contact with the active alumina agglomerates defined above, dissolves at least a portion of the aluminium ions. The acid dissolves at least 0.5% and at most 15% by weight of the alumina of the agglomerates. Its concentration in the aqueous treatment medium is less than 20% by weight and preferably in the range 1% to 15%. Preferably, strong acids are used such as nitric acid, hydrochloric acid, perchloric acid or sulphuric acid, or weak acids such as acetic acid, used in a concentration such that their aqueous solution has a pH of less than about 4.

The term "compound supplying an anion capable of combining with aluminium ions in solution" means any compound which is capable in solution of liberating an anion $A^{n-}$ which with the $Al^{3+}$ cations is capable of forming products in which the atomic ratio n(A/Al) is 3 or less.

A particular case of these compounds may be illustrated by basic salts with general formula $Al_2(OH)_x A_y$ in which $0<x<6$; $ny<6$; n represents the number of charges on the anion A.

The concentration of that compound in the aqueous treatment medium is less than 50% by weight and preferably in the range 3% to 30%.

Preferably, compounds capable in solution of liberating anions selected from the group constituted by nitrate, chloride, sulphate, perchlorate, chloroacetate, dichloroacetate, trichloroacetate, bromoacetate, dibromoacetate anions, and anions with general formula RCOO(—) are used, in which R represents a radical from the group comprising H, $CH_3$, $C_2H_5$, $CH_3CH_2$, $(CH_3)_2CH$.

Compounds which are capable in solution of liberating the anion $A^{n-}$ may carry out said liberation either directly, for example by dissociation, or indirectly, for example by hydrolysis. The compounds may in particular be selected from the group comprising: mineral or organic acids, anhydrides, organic or mineral salts, esters. Of the mineral salts, alkali salts or alkaline-earth salts which are soluble in aqueous media may be cited, such as those of sodium, potassium, magnesium or calcium, ammonium salts, aluminium salts and salts of rare earths.

This first treatment may be carried out either by dry impregnation of agglomerates or by immersing the agglomerates in the aqueous acid solution. The term "dry impregnation" means contact of alumina agglomerates with a volume of solution which is less than or equal to the total pore volume of the treated agglomerates.

In a particularly preferred implementation, the aqueous medium is a mixture of nitric and acetic acid or nitric acid and formic acid.

The hydrothermal treatment is carried out at a temperature in the range from about 80° C. to about 250° C., for a period of time in the range from about 5 minutes to about 36 hours.

This hydrothermal treatment causes no loss of alumina.

Preferably, the temperature is in the range 120° C. to 220° C. for a period in the range 15 minutes to 18 hours.

This treatment constitutes a hydrothermal treatment of the active alumina agglomerates which transforms at least a portion thereof into boehmite. This hydrothermal treatment (autoclaving) may be carried out either under saturated vapour pressure or at a partial vapour pressure of water vapour of at least 70% of the saturated vapour pressure corresponding to the treatment temperature.

The association of an acid which can dissolve at least a portion of the alumina and an anion which can form the products described above during hydrothermal treatment results in the production of a particular boehmite which is a precursor for the acicular support platelets of the invention the growth of which proceeds radially from crystallization seeds.

Further, the concentration of acid and compound in the treatment mixture and the hydrothermal treatment conditions used are such that there is no loss of alumina. The increase in porosity following treatment is thus due to expansion of the agglomerates during treatment and not to a loss of alumina.

g) Finally, the crushed agglomerates are optionally dried at a temperature which is generally in the range from about 100° C. to 200° C. for a period which is sufficient to remove water which is not chemically bound. The agglomerates then undergo thermal activation at a temperature in the range from about 500° C. to about 1100° C. for a period in the range from about 15 minutes to 24 hours.

The active alumina support obtained in accordance with the invention, mainly with an irregular and non-spherical shape, generally has the following characteristics: the loss on ignition, measured by calcining at 1000° C., is in the range from about 1% to about 15% by weight, the specific surface area is in the range from about 80 to about 300 m²/g, their total pore volume is in the range from about 0.45 to about 1.5 cm³/g.

The resulting crushed active alumina agglomerates also preferably have the following characteristics:
a specific surface area in the range 75 to 250 m²/g;
a settled packing density in the range from about 0.35 to 0.80 g/cm³;
a total pore volume (TPV) in the range 0.5 to about 2.0 cm³/g;
a pore distribution, determined using the Hg porosimetry technique, which is preferably characterized as follows:
% of total pore volume as pores with a mean diameter of less than 100 Å: between 0 and 10
% of total pore volume as pores with a mean diameter between 100 and 1000 Å: between 40 and 90
% of total pore volume as pores with a mean diameter between 1000 and 5000 Å: between 5 and 60
% of total pore volume as pores with a mean diameter between 5000 and 10000 Å: between 5 and 50
% of total pore volume as pores with a mean diameter of more than 10000 Å: between 5 and 20.

The process cited above for preparing an alumina support can modify the pore volume distribution depending on the pore size of the untreated agglomerates. It can increase the proportion of pores in the range 100 to 1000 Å, reduce the proportion of pores of less than 100 Å and reduce the proportion of pores of over 5000 Å by modifying the proportion of pores in the range 1000 to 5000 Å less.

The alumina agglomerates obtained may have been thermally stabilized by rare earths, silica or alkaline-earth metals, as is well known to the skilled person. In particular, they may be stabilized using the process described in U.S. Pat. No. 4,061,594.

Deposit of Active Phase and Doping Element or Elements onto Support Obtained

The deposit obtained at the end of step g) is impregnated with at least one solution of at least one catalytic metal and optionally with at least one dopant.

The deposit of active phase in the oxide state and the doping element or elements onto the crushed alumina agglomerates is preferably carried out by the "dry" impregnation method which is known to the skilled person Impregnation is highly preferably carried out in a single step using a solution containing all of the constituent elements of the final catalyst (co impregnation). Other impregnation sequences may be carried out to obtain the catalyst of the present invention.

It is also possible to introduce part of the metals and part of the doping element or elements or even all of them during preparation of the support, in particular during the granulation step.

Sources of elements from group VIB which may be used are well known to the skilled person. Examples of sources of molybdenum and tungsten which may advantageously be used are oxides, hydroxides, molybdic and tungstic acids and their salts, in particular ammonium salts such as ammonium molybdate, ammonium heptamolybdate, ammonium tungstate, phosphomolybdic and phosphotungstic acids and their salts, acetylacetonates, xanthates, fluorides, chlorides, bromides, iodides, oxyfluorides, oxychlorides, oxybromides, oxyiodides, carbonyl complexes, thiomolybdates and carboxylates. Preferably, oxides and ammonium salts are used, such as ammonium molybdate, ammonium heptamolybdate or ammonium tungstate.

Sources of group VIII elements which may be used are known; examples are nitrates, sulphates, phosphates, halides, carboxylates such as acetates or carbonates, hydroxides and oxides.

The preferred phosphorus source is orthophosphoric acid, however salts and esters such as alkaline phosphates, ammonium phosphates, gallium phosphates or alkyl phosphates are also suitable. Phosphorous acids, for example hypophosphorous acid, phosphomolybdic acid and its salts, phosphotungstic acid and its salts may also advantageously be used. The phosphorus may, for example, be introduced in the form of a mixture of phosphoric acid and a basic nitrogen-containing organic compound such as ammonia, primary and secondary amines, cyclic amines, compounds from the pyridine family and quinolines and compounds from the pyrrole family.

The boron source may be boric acid, preferably orthoboric acid $H_3BO_4$, ammonium diborate or pentaborate, boron oxide or boric esters. The boron may, for example be introduced using a solution of boric acid in a water/alcohol mixture or in a water/ethanolamine mixture.

A number of silicon sources may be employed. Thus, it is possible to use ethyl orthosilicate $Si(OEt)_4$, siloxanes, silicones, halogen silicates such as ammonium fluorosilicate $(NH_4)_2SiF_6$ or sodium fluorosilicate $Na_2SiF_6$. Silicomolybdic acid and its salts or silicotungstic acid and its salts may also advantageously be employed. The silicon may, for example, be added by impregnating with ethyl silicate in solution in a water/alcohol mixture.

Sources of the group VIIA element (halogens) which may be used are well known to the skilled person. Examples are fluoride anions which may be introduced in the form of hydrofluoric acid or its salts. Said salts are formed with alkali metals, ammonium or an organic compound. In the latter case, the salt is advantageously formed in the reaction mixture by reaction between the organic compound and hydrofluoric acid. It is also possible to use hydrolyzable compounds which may liberate fluoride anions in water, such as ammonium fluorosilicate $(NH_4)_2SiF_6$, silicon tetrafluoride $SiF_4$ or sodium fluorosilicate $Na_2SiF_6$. The fluorine may, for example, be introduced by impregnating with an aqueous solution of hydrofluoric acid or ammonium fluoride.

Advantageously, after said support impregnation, the process for preparing the catalyst of the present invention comprises the following steps:
- leaving the moist solid in a moist atmosphere at a temperature in the range 10° C. to 80° C.;
- drying the moist solid obtained at a temperature in the range 60° C. to 150° C.;
- calcining the solid obtained after drying at a temperature in the range 150° C. to 800° C.

Calcining is not necessary in the case in which the impregnation solutions are examples of compounds containing elemental nitrogen.

Characteristics of Catalyst

The pore distribution of the catalyst, determined by mercury porosity, is as follows:
- % of total pore volume as pores with a mean diameter of less than 100 Å: between 0 and 10
- % of total pore volume as pores with a mean diameter between 100 and 1000 Å: between 40 and 90
- % of total pore volume as pores with a mean diameter between 1000 and 5000 Å: between 5 and 60
- % of total pore volume as pores with a mean diameter between 5000 and 10000 Å: between 5 and 50
- % of total pore volume as pores with a mean diameter of more than 10000 Å: between 5 and 20.

The total pore volume of the catalysts of the invention, determined by mercury porosimetry, is in the range 0.4 to 1.8 g/cm$^3$.

Preferably, the settled packing density of the catalysts of the invention is in the range 0.35 to 0.80 g/cm$^3$.

Preferably, in the catalysts of the present invention, the diameter of the pores at VHg/2 is in the range 300 to 700 Å, i.e. the mean pore diameter wherein the volume on the pore distribution graph corresponds to half the total pore volume is in the range 300 to 700 Å, i.e. 30 to 70 nm.

The catalysts of the invention have a specific surface area, measured by the BET method, in the range 50 to 250 m$^2$/g.

To use the catalyst of the invention in an ebullated bed, the mechanical strength of the catalyst is a determining factor and is measured by determining the percentage of fines (particles passing through a 850 μm sieve) produced when the catalyst is rotated for a given period in a cylinder provided with baffles. At the end of the test, the solid obtained is sieved and the fines are weighed. The loss on attrition is quantified using the ASTM D4058-96 standard.

The loss on attrition is then calculated using the following formula:

% loss on attrition=100(1−weight of catalyst with a size of more than 850 μm after test/weight of catalyst with size more than 850 μm loaded into cylinder).

The skilled person will normally assume that a catalyst is only usable in an ebullated bed reactor when the loss on attrition measured by this method is less than 5% by weight.

For the catalysts of the invention, the loss on attrition quantified using the ASTM D4058-96 standard is less than 5% by weight, and preferably 2% or less.

To use the catalyst of the invention in fixed bed mode, the mechanical strength is determined by measuring the crush strength using the Shell (ESH) method which consists of crushing a certain quantity of particles and recovering the fines which are generated. The crush strength corresponds to the force exerted to obtain a percentage of fines (fines being the particles passing through a 425 μm sieve) representing 0.5% of the mass of particles which undergo the test. The method usually used, known as the Shell Method, has the reference "Shell Method Series SMS1471-74" and is carried out in a bed crushing apparatus sold by Vinci Technologie under the reference "Bulk crush strength—Shell-SMS Method".

Generally, a catalyst can be used in fixed bed mode if its Shell crush strength is over 1.0 MPa.

For the catalysts of the invention, the crush strength measured using the Shell method is over 1.0 MPa and preferably 1.5 MPa or more. The invention also concerns the process for preparing the catalyst including the support preparation process followed by impregnating the support using at least one solution of at least one catalytic metal and an optional dopant.

Use of the Catalyst of the Invention in Hydroconverting/Hydrocracking/Hydrotreating Hydrocarbon Feeds in an Ebullated Bed The catalysts of the invention may be employed in an ebullated bed reactor alone or partially in the form of fragments and partially in the form of beads, as described in U.S. Pat. No. 4,552,650, or in the form of cylindrical extrudates.

The feeds may, for example, be atmospheric residues or vacuum residues from straight through distillation, deasphalted oils, residues from conversion processes such as those derived from coking, or from fixed bed, ebullated bed or moving bed hydroconversion. These feeds may be used as is or diluted with a hydrocarbon fraction of a mixture of hydrocarbon fractions which may, for example, be selected from products from the FCC process, a light cycle oil (LCO), a heavy cycle oil (HCO), a decanted oil (DO), a slurry, or they may be derived from distillation, gas oil fractions, in particular those obtained by vacuum distillation denoted VGO (vacuum gas oil). The heavy feeds may thus include cuts derived from coal liquefaction, aromatic extracts or any other hydrocarbon cut.

The heavy feeds generally have initial boiling points of more than 300° C., more than 1% by weight of molecules having a boiling point of more than 500° C., a Ni+V metals content of more than 1 ppm by weight, and an asphaltenes content, precipitated in heptane, of more than 0.05%.

In one implementation, part of the converted effluents may be recycled upstream of the unit operating the hydroconversion/hydrotreatment process.

The heavy feeds may be mixed with powdered coal; this mixture is generally termed a slurry. These feeds may be by-products from the conversion of coal and re-mixed with fresh coal. The coal content in the heavy feed generally and preferably represents 0.25 by weight (coal/feed) and may vary between 0.1 and 1. The coal may contain lignite, it may be a sub-bituminous coal or it may be bituminous. Any type of coal may be used in the invention, both in the first reactor and in all of the ebullated bed reactors.

In such a process, the catalyst is generally used at a temperature in the range 320° C. to 470° C., preferably 400° C. to 450° C., at a partial pressure of hydrogen of about 3 MPa to about 30 MPa, preferably 10 to 20 MPa, at a space velocity of about 0.1 to 10 volumes of feed per volume of catalyst per hour, and with a ratio of gaseous hydrogen to liquid hydrocarbon feed in the range 100 to 3000 normal cubic meters per cubic meter, preferably 200 to 1200 normal cubic meters per cubic meter.

For residue hydroconversion, a particular application of the catalyst of the invention is the use of the catalyst in the presence of coal mixed with the heavy feed to be converted. As described in U.S. Pat. No. 4,874,506 and U.S. Pat. No. 4,437,973, the powdered coal is mixed with a hydrocarbon feed which is richer in hydrogen for conversion in the presence of hydrogen and a supported catalyst. This operation is generally carried out in one or more reactors in series operating in ebullated bed mode. Using the catalyst of the invention could improve the hydrodynamic behaviour of the system and the continuous catalyst withdrawal unit. As an example, the conversion of coal in a liquid is carried out by the first reactor and then the HDM, the impurities are captured at the same time and then a finishing step may be carried out using other catalysts.

The catalysts of the present invention preferably undergo a sulphurization treatment to transform at least part of the metallic species into the sulphide before bringing them into contact with the feed to be treated. This sulphurization activation treatment is well known to the skilled person and may be carried out using any method which has been described in the literature.

One conventional sulphurization method which is well known to the skilled person consists of heating the mixture of solids in a stream of a mixture of hydrogen and hydrogen sulphide or in a stream of a mixture of hydrogen and hydrocarbons containing sulphur-containing molecules at a temperature in the range 150° C. to 800° C., preferably in the range 250° C. to 600° C., generally in a traversed bed reaction zone.

Process for Hydroconverting/Hydrocracking/Hydrotreating Hydrocarbon Feeds in Fixed Bed Mode The catalysts described above may also be used in a fixed bed reactor, alone or partly in the form of fragments and partly in the form of beads as described in U.S. Pat. No. 4,552,650 or in the form of cylindrical extrudates.

The feeds may, for example, be atmospheric residues or vacuum residues from direct distillation, deasphalted oils, residues from conversion processes such as those from coking, fixed bed, ebullated bed or moving bed hydroconversion. These feeds may be used as is or be diluted with a hydrocarbon fraction or a mixture of hydrocarbon fractions which may, for example, be selected from products derived from the FCC process, a light cycle oil (LCO), a heavy cycle oil (HCO), a decanted oil (DO), a slurry, or they may be derived from distillation, gas oil fractions, in particular those obtained by vacuum distillation denoted VGO (vacuum gas oil). The heavy feeds may thus include cuts derived from coal liquefaction, aromatic extracts, or any other hydrocarbon cut.

The heavy feeds generally have initial boiling points of more than 300° C., more than 1% by weight of molecules having a boiling point of more than 500° C., a Ni+V metals content of more than 1 ppm by weight, and an asphaltenes content, precipitated in heptane, of more than 0.05%.

In one implementation, part of the converted effluents may be recycled upstream of the unit operating the hydroconversion/hydrotreatment process.

In such a process, the catalyst is generally used at a temperature in the range 320° C. to 450° C., preferably 350° C. to 410° C., at a partial pressure of hydrogen of about 3 MPa to about 30 MPa, preferably 10 to 20 MPa, at a space velocity of about 0.05 to 5 volumes of feed per volume of catalyst per hour, preferably 0.2 to 0.5 volumes of feed per volume of catalyst per hour, and with a ratio of gaseous hydrogen to liquid hydrocarbon feed in the range 200 to 5000 normal cubic meters per cubic meter, preferably 500 to 1500 normal cubic meters per cubic meter.

The catalysts used in the present invention preferably undergo a sulphurization treatment to transform at least part of the metallic species into the sulphide form before bringing them into contact with the feed to be treated. This sulphurization activation treatment is well known to the skilled person and may be carried out using any method which has been described in the literature.

One conventional sulphurization method which is well known to the skilled person consists of heating the mixture of solids in a stream of a mixture of hydrogen and hydrogen sulphide or in a stream of a mixture of hydrogen and hydrocarbons containing sulphur-containing molecules at a temperature in the range 150° C. to 800° C., preferably in the range 250° C. to 600° C., generally in a traversed bed reaction zone.

The following examples illustrate the invention described herein without in any way limiting its scope.

Example 1

Preparation of Crushed Alumina Agglomerates in Accordance with the Invention

The starting material was alumina obtained by very rapid decomposition of hydrargillite in a stream of hot air (T=1000° C.). The product obtained was constituted by a mixture of transition aluminas: (khi) and (rho) aluminas. The specific surface area of this product was 300 m$^2$/g and the loss on ignition (LOI) was 5%.

The alumina (after milling) was in the form of a powder the mean particle diameter of which was 7 micrometers.

This alumina was mixed with wood flour as a pore-forming agent (15% by weight) then formed in a granulator or pelletizer for a period which was adapted to the desired granulometry. The agglomerates obtained underwent a maturation step by passing steam at 100° C. for 24 hours then drying. They were then sieved and crushed and finally calcined.

These beads were then dry impregnated with a solution containing, for example, a mixture of nitric acid and acetic acid in an aqueous phase in an impregnator drum. Once impregnated, they were introduced into an autoclave for about 2 hours, at a temperature of 210° C. and a pressure of 20.5 bars.

At the autoclave outlet, crushed alumina agglomerates were obtained in accordance with the invention which were dried for 4 hours at 100° C. and calcined for 2 hours at 650° C.

The agglomerate size was in the range 1 to 1.5 mm. Their pore volume was 0.95 cm³/g with a multimodal pore distribution. The specific surface area of the support was 130 m²/g.

Example 2

Preparation of Alumina Beads (not in Accordance with the Invention)

A catalyst was prepared in the form of beads using the procedure of Example 1 with the exception of the crushing step.

Beads with a granulometry in the range 1.4 to 2.8 mm were selected.

Example 3

Preparation of Crushed Alumina Agglomerates, in Accordance with the Invention

The support of this example was prepared as described in Example 1, but the granulation time and the sieving-crushing steps were modified to obtain agglomerates with a size in the range 1.4 to 2.8 mm.

Example 4

Preparation of Alumina Agglomerates (not in Accordance with the Invention)

A catalyst was prepared in the form of beads using the procedure of Example 1 with the exception of the crushing step which was carried out after autoclaving.

At the autoclave outlet, after the drying step (4 h, 100° C.) and the calcining step (2 h, 650° C.), the beads were crushed to obtain a 1.4-2.8 mm fraction.

Example 5

Preparation of Catalysts A, B, C and D from the Supports of Examples 1, 2, 3, 4

We dry impregnated the supports of Examples 1, 2, 3, 4 with an aqueous solution comprising molybdenum and nickel salts and phosphoric acid. The molybdenum precursor was molybdenum oxide $MoO_3$ and the nickel precursor was nickel carbonate $Ni(CO)_3$. After maturation at ambient temperature in a water-saturated atmosphere, the impregnated supports were dried overnight at 120° C. and calcined at 500° C. for 2 hours in dry air. The final molybdenum trioxide content was 9.4% of the finished catalyst weight. The final nickel oxide NiO content was 2% of the finished catalyst weight. The final phosphoric oxide $P_2O_5$ content was 2% of the finished catalyst weight.

The textural and physico-chemical characteristics of catalysts A, B, C and D derived respectively from the supports of Examples 1, 2, 3 and 4 are shown in Table 1.

TABLE 1

| Catalyst | A | B | C | D |
| --- | --- | --- | --- | --- |
| $MoO_3$ (wt %) | 9.4 | 9.4 | 9.4 | 9.4 |
| NiO (wt %) | 2.0 | 2.0 | 2.0 | 2.0 |

TABLE 1-continued

| Catalyst | A | B | C | D |
| --- | --- | --- | --- | --- |
| $P_2O_5$ (wt %) | 2.0 | 2.0 | 2.0 | 2.0 |
| $SiO_2$ (wt %) | — | — | — | — |
| Ni/Mo (at/at) | 0.40 | 0.40 | 0.40 | 0.40 |
| P/Mo (at/at) | 0.42 | 0.42 | 0.42 | 0.42 |
| dMo (at/nm²) | 3.8 | 3.8 | 3.8 | 3.8 |
| SPD (g/cm³) | 0.55 | 0.52 | 0.51 | 0.52 |
| $S_{BET}$ (m²/g) | 97 | 105 | 103 | 100 |
| TPV Hg (cm³/g) | 0.80 | 0.95 | 0.90 | 0.90 |
| Dp at VHg/2 (Å) | 350 | 380 | 370 | 370 |
| V Hg > 500 Å (cm³/g) | 0.35 | 0.44 | 0.40 | 0.40 |
| V Hg > 1000 Å (cm³/g) | 0.26 | 0.30 | 0.28 | 0.28 |

Example 6

Comparison of Mechanical Resistance to Attrition of Catalysts A, B, C, D for Ebullated Bed Use The mechanical resistance to attrition of catalysts A, B, C and D was determined using the method shown in the description.

Table 2 below shows the results obtained for catalysts A, B, C, D.

TABLE 2

| Catalyst | A | B | C | D |
| --- | --- | --- | --- | --- |
| % fines produced after attrition (wt) | 1.5% | 2% | 2% | 12% |

Thus, catalyst D could not be used in an ebullated bed as the amount of fines generated at the end of the attrition test was much higher than 5% by weight.

Example 7

Comparison of Performances in Ebullated Bed Residue Hydroconversion

The performances of catalysts A (in accordance with the invention), B (not in accordance) and C (in accordance with the invention) were compared during a pilot test in a pilot unit comprising a tubular reactor provided with a device to maintain the catalyst inside the reactor in a permanently ebullated state. The pilot unit used was representative of an H-OIL® industrial unit for ebullated bed hydroconversion residues described in many patents, for example U.S. Pat. No. 4,521,295 and U.S. Pat. No. 4,495,060.

The pilot reactor was loaded with 1 liter of catalyst.

The unit was charged with a gas oil from vacuum distillation or VD with the characteristics shown in Table 3.

TABLE 3

| Feed | VD | SAFANIYA VR | BOSCAN AR |
| --- | --- | --- | --- |
| Spec grav | 0.9414 | 1.0457 | 1.023 |
| Sulphur (weight %) | 2.92 | 5.31 | 5.5 |
| Nitrogen (ppm by weight) | 1357 | 4600 | 5800 |
| Viscosity (cSt) | 13.77 | 5110 | 1380 |
| Temp viscosity (° C.) | 100 | 100 | 100 |

TABLE 3-continued

| Feed | VD | SAFANIYA VR | BOSCAN AR |
|---|---|---|---|
| Viscosity (cSt) | 38.64 | 285 | 120 |
| Temp viscosity (° C.) | 70 | 150 | 150 |
| C. Conradson (wt %) |  | 23.95 | 16.9 |
| Asphalt. C7 (wt %) |  | 14.5 | 14.0 |
| Ni (ppm by weight) | <2 | 52 | 125 |
| V (ppm by weight) | 3.3 | 166 | 1290 |
| D1160: IP, ° C | 361 | 496 | 224 |
| D1160: 05% vol, ° C. | 416 | 536 | 335 |
| D1160: 10% vol, ° C. | 431 | 558 | 402 |
| D1160: 20% vol, ° C. | 452 |  | 474 |
| D1160: 30% vol, ° C. | 467 |  | 523 |
| D1160: 40% vol, ° C. | 479 |  | 566 |
| D1160: 50% vol, ° C. | 493 |  |  |
| D1160: 60% vol, ° C. | 507 |  |  |
| D1160: 70% vol, ° C. | 522 |  |  |
| D1160: 80% vol, ° C. | 542 |  |  |
| D1160: 90% vol, ° C. | 568 |  |  |
| D1160: 95% vol, ° C. | 589 |  |  |
| D1160: EP, ° C. | 598 | 558 | 566 |

The temperature was increased to 343° C. then the test feed, a Safaniya type vacuum distillation residue (VR) was injected. The reaction temperature was than raised to 410° C. The hydrogen flow rate was 600 l/l; the hourly space velocity was 0.3 l/l/h.

The conditions of the test were isothermal, which allowed the deactivation of the catalyst to be measured by directly comparing the performances at different ages. The ages are expressed here in $m^3$ of feed/kg of catalyst ($m^3$/kg), which represents the cumulative quantity of feed passed over the catalyst compared with the loaded weight of catalyst.

The conversion performance, HDM, is defined as follows:

Conversion (wt %)=((% wt of 550° C.+)$_{feed}$−(% wt of 550° C.+)$_{test}$/((% wt of 550° C.+)$_{feed}$*100

HDM (wt %)=((ppm by wt of Ni+V)$_{feed}$−(ppm by wt of Ni+V)$_{test}$/((ppm by wt of Ni+V)$_{feed}$*100

The feed was then changed to a Boscan atmospheric residue. This feed allowed the metal retention of the catalyst to be evaluated. The test aimed to maintain the % HDM in the range 80% to 60%. To this end, the reaction temperature was kept at 410° C. The test was stopped when the HDM fell below 60%. Conversion was maintained between 50% and 60% by weight to obtain good fuel stability. To evaluate the stability of the products formed, a measurement was carried out using the Shell P value method on the 350° C.+ fraction of the effluent recovered after the test.

Table 4 compares the performance of catalysts A, B and C at the start of the test (0.56 $m^3$/kg) and at the end of the test (1.44 $m^3$/kg).

Catalyst D could not be evaluated even in terms of initial activity as the production of fines at the end of the second day of the test (age <0.17 $m^3$/kg) caused operational problems (plugging, appearance of pressure gradients) and the unit was stopped.

TABLE 4

| Catalyst + age | Conv (wt %) | HDM (wt %) | Retention of metals (wt %) | Shell P value |
|---|---|---|---|---|
| A at 0.56 $m^3$/kg, Saf VR | 55 | 72 | 9.5 | 1.6 |
| B, at 0.56 $m^3$/kg, Saf VR | 54 | 55 | 8.1 | 1.4 |
| C, at 0.56 $m^3$/kg, Saf VR | 54 | 65 | 8.7 | 1.5 |

TABLE 4-continued

| Catalyst + age | Conv (wt %) | HDM (wt %) | Retention of metals (wt %) | Shell P value |
|---|---|---|---|---|
| A at 1.44 $m^3$/kg, Boscan AR | 55 | 80 | 120 | 1.4 |
| B at 1.44 $m^3$/kg, Boscan AR | 56 | 70 | 100 | 1.2 |
| C at 1.44 $m^3$/kg, Boscan AR | 55 | 78 | 115 | 1.3 |

The HDM catalysts supported on crushed agglomerates of the invention had improved initial HDM properties and higher stability. Higher HDM performances were obtained with a smaller agglomerate size.

Example 8

Comparison of Fixed Bed Mechanical Strength of Catalysts A, B, C, D

Table 5 below shows the results obtained for fixed bed crushing measurements carried out using the method described for catalysts A, B, C, D.

TABLE 5

| Catalyst | A | B | C | D |
|---|---|---|---|---|
| Pressure exerted for 0.5% by weight of fines | 1.8 MPa | 1.7 MPa | 1.7 MPa | 0.8 MPa |

The Shell crush strength for catalyst D was not compatible with use in a fixed bed residue hydroconversion unit as this value was below 1 MPa.

Example 9

Comparison of Performances in Fixed Bed Residue Hydroconversion for Catalysts A, B and C The performances of catalysts A (in accordance), B (not in accordance) and c (in accordance) described above were compared during a fixed bed pilot test for hydrotreating various oil residues. In the first instance, an atmospheric residue (AR) of Middle Eastern origin (Arabian Light) was processed followed by a Venezuelan extra heavy crude atmospheric residue (Boscan). These two residues are characterized by high viscosities, high Conradson carbon numbers and high asphaltenes contents. The RA Boscan also had a very high nickel and vanadium contents.

The characteristics of these residues are shown in Table 6:

TABLE 6

|  |  | RA Arabian Light | RA Boscan |
|---|---|---|---|
| 15/4 density |  | 0.9712 | 1.023 |
| Viscosity at 100° C. | $mm^2/s$ | 161 | 1380 |
| Viscosity at 150° C. | $mm^2/s$ | 45 | 120 |
| Sulphur | wt % | 3.38 | 5.5 |
| Nitrogen | ppm | 2257 | 5800 |
| Nickel | ppm | 12 | 125 |
| Vanadium | ppm | 41 | 1290 |
| Iron | ppm | 1 | 8 |
| Carbon | wt % | 84.8 | 83.40 |
| Hydrogen | wt % | 11.1 | 10.02 |
| Aromatic carbon | % | 24.8 | 29.0 |
| Molecular mass | g/mol | 528 | 730 |

TABLE 6-continued

|  |  | RA Arabian Light | RA Boscan |
|---|---|---|---|
| Conradson carbon | wt % | 10.2 | 16.9 |
| C5 asphaltenes | wt % | 6.4 | 24.1 |
| C7 asphaltenes | wt % | 3.4 | 14.9 |
| SARA | wt % |  |  |
| Saturates | wt % | 28.1 | 8.7 |
| Aromatics | wt % | 46.9 | 35.0 |
| Resins | wt % | 20.1 | 34.0 |
| Asphaltenes | wt % | 3.5 | 14.6 |
| Simulated distillation |  |  |  |
| IP | ° C. | 296 | 224 |
| 5% | ° C. | 400 | 335 |
| 10% | ° C. | 422 | 402 |
| 20% | ° C. | 451 | 474 |
| 30% | ° C. | 474 | 523 |
| 40% | ° C. | 502 | 566 |
| 50% | ° C. | 536 |  |
| 60% | ° C. | 571 |  |
| 70% | ° C. |  |  |
| 80% | ° C. |  |  |
| 90% |  |  |  |
| 95% |  |  |  |
| EP | ° C. | 571 | 566 |

The tests were carried out in a hydrotreatment pilot unit comprising a fixed bed tubular reactor. The reactor was filled with 1 liter of catalyst. The fluid flow (residue+hydrogen) in the reactor was upwards. This type of pilot unit is representative of the operation of one of the reactors of a HYVAHL unit from IFP for fixed bed residue hydroconversion.

After a step for sulphurization by circulating a gas oil cut supplemented with dimethyldisulphide in a reactor at a final temperature of 350° C., the unit was operated for 300 hours with Arabian light atmospheric residue at 370° C., 150 bars of total pressure using a HSV of 0.5 l of feed/l of catalyst/h. The hydrogen flow rate was such that it had a ratio of 1000 l/l of feed. The test conditions using ALAR were isothermal, which allowed the initial deactivation of the catalyst to be measured by directly comparing the performances at different ages. The ages were expressed as hours of operation with Arabian light atmospheric residue, the zero time being taken as that when the test temperature (370° C.) was reached.

The HDM, HDASC7 and HDCCR performances are defined as follows:

HDM (wt %)=((ppm by wt of Ni+V)$_{feed}$−(ppm by wt of Ni+V)$_{test}$/((ppm by wt of Ni+V)$_{feed}$*100

HDASC7 (wt %)=((wt % of asphaltenes insoluble in n-heptane)$_{feed}$−(wt % of asphaltenes insoluble in n-heptane)$_{test}$/((wt % of asphaltenes insoluble in n-heptane)$_{feed}$*100

HDCCR (wt %)=((wt % of CCR)$_{feed}$−(wt % of CCR)$_{test}$/((wt % of CCR)$_{feed}$*100

Table 7 compares the HDM, HDASC7 and HDCCR performances of catalysts A, B and C at the start of the test (50 hours) and at the end of the test (300 hours).

TABLE 7

| Catalyst + age | HDM (wt %) | HDASC7 (wt %) | HDCCR (wt %) |
|---|---|---|---|
| A at 50 hours | 90 | 91 | 50 |
| B at 50 hours | 83 | 85 | 40 |
| C at 50 hours | 87 | 88 | 46 |
| A at 300 hours | 85 | 86 | 44 |
| B at 300 hours | 74 | 75 | 32 |
| C at 300 hours | 83 | 83 | 39 |

The feed was then changed to a Boscan atmospheric residue. The test conditions were aimed at maintaining a constant HDM ratio of about 80% by weight throughout the cycle. To this end, catalyst deactivation was compensated for by progressively increasing the reaction temperature. The test was stopped when the reaction temperature reached 420° C., a temperature which is considered to be representative of the temperature at the end of the cycle of an industrial residue hydrorefining unit.

Table 8 compares the quantities of nickel+vanadium deriving from Boscan AR deposited on the 3 catalysts.

TABLE 8

| Catalyst | Ni + V deposited (% of mass of fresh catalyst) |
|---|---|
| Catalyst A | 97 |
| Catalyst B | 85 |
| Catalyst C | 91 |

It appears that the HDM catalysts supported on agglomerates of the invention produced initial performances on ALAR and retention on BAR which were better than those for the catalyst supported on beads; the gains in performances and retention are better when the agglomerates are smaller.

The invention claimed is:

1. A process for preparing a catalyst comprising an alumina-based support, at least one catalytic metal or compound of a catalytic metal from group VIB and/or VIII, the pore structure of which is composed of a plurality of juxtaposed agglomerates and each formed by a plurality of acicular platelets, the platelets of each agglomerate generally being oriented radially with respect to the others and with respect to the centre of the agglomerate, said support having an irregular and non-spherical shape and being mainly in the form of fragments, said process including the following successive steps:
   a) granulation starting from an active alumina powder having a low crystallinity and/or amorphous structure, to obtain agglomerates in the form of beads;
   b) maturing said beads in a moist atmosphere between 60° C. and 100° C. then drying said beads;
   c) sieving resultant dried beads to recover a fraction of said beads;
   d) crushing said fraction of beads to modify the shape of at least 50% by weight of the beads the remainder being spherical agglomerates;
   e) calcining at least a portion of said crushed fraction at a temperature in the range of 250° C. to 900° C.;
   f) impregnating resultant calcined crushed fraction with acid and conducting an autoclaving treatment at a temperature in the range of 80° C. to 250° C.;
   g) drying resultant acidified and autoclaved fraction, then calcining the resultant dried and autoclaved fraction of step (f) at a temperature in the range of 500° C. to 1100° C. to obtain said support, and
   h) impregnating said support with at least one solution of said at least one catalytic metal or compound of said catalytic metal from group VIB and/or VIII, and the resultant catalyst has a higher mechanical resistance to attrition than a comparable catalyst wherein the crushing step is conducted after the autoclaving treatment.

2. A process according to claim 1, in which the amount of group VIB metal, expressed as the % by weight of oxide with respect to the final catalyst weight, is in the range of 1% to 20% and in which the amount of group VIII metal, expressed as the % by weight of oxide with respect to the final catalyst weight, is in the range of 0 to 10%.

3. A process according to claim 2, in which the group VIB metal is molybdenum and the group VIII metal is nickel.

4. A process according to claim 1, in which in granulation step a), the active alumina powder is moistened with an aqueous solution, then resultant moistened powder is agglomerated in a granulator.

5. A process according to claim 1, in which in step f), the crushed fraction is impregnated with an aqueous solution comprising at least one acid which can dissolve at least a portion of the alumina of the support, and with at least one compound, distinct from said acid, supplying an anion which is capable of combining with aluminium ions in solution.

6. A process according to claim 1, wherein after impregnation of the support in step h, the resultant catalyst is left in a moist atmosphere at a temperature in the range of 10° C. to 80° C., is dried at a temperature in the range 60° C. to 150° C. and is calcined at a temperature in the range 150° C. to 800° C.

* * * * *